United States Patent [19]
Konopatov et al.

[11] 3,894,899
[45] July 15, 1975

[54] METHOD FOR MAKING A DRUM-TYPE HONEYCOMBLESS VACUUM FILTER

[76] Inventors: Vladimir Grigorievich Konopatov, Seleznevskaya ulitsa, 25, kv. 7; Izrail Mikhailovich Sorotskin, Srednaya pervomaiskaya ulitsa, 36, kv. 23; Ivan Ivanovich Rumyantsev, ulitsa 8 Marta, 4, korpus 2, kv. 135; Vadim Petrovich Abramov, Yaroslavskaya ulitsa 1/9, kv. 91; Alexandr Sergeevich Kupriyanov, Dmitrovskoe shosse 45, kv. 65; Orest Mikhailovich Mudrenov, ulitsa Dmitrova 19, kv. 74, all of Moscow; Ivan Andreevich Soloviev, Khotkovo, ulitsa Likhacheva 1, kv. 24, Moskovskaya oblast; Vladimir Alexandrovich Shakhov, Khotkovo, ulitsa Mikheenko, 5, kv. 35, Moskovskaya oblast; Anatoly Konstantinovich Mironov, Khotkovo, ulitsa Likhacheva 1, kv. 26, Moskovskaya oblast; Galina Mikhailovna Zhukovskaya, Khotkovo, ulitsa Mikheenko, 19, kv. 36, Moskovskaya oblast; Arkady Markovich Gleikh, ulitsa Dybenko, 26, korpus 1, kv. 63, Moscow, all of U.S.S.R.

[22] Filed: July 26, 1973

[21] Appl. No.: 383,306

[52] U.S. Cl.................................. 156/187; 210/404
[51] Int. Cl..................... B01d 33/06; B65h 81/00
[58] Field of Search.................. 210/402, 403, 404; 264/185, 187

[56] References Cited
UNITED STATES PATENTS

| 872,616 | 12/1967 | Lanchild | 210/404 X |
| 2,582,273 | 1/1952 | Peterson et al. | 210/404 |
| 3,419,150 | 12/1968 | Davis | 210/404 X |
| 3,494,473 | 2/1970 | Krynski | 210/404 |
| 3,504,802 | 4/1970 | Luthi | 210/404 |
| 3,517,818 | 6/1970 | Luthi | 210/404 X |
| 3,680,708 | 8/1972 | Luthi | 210/404 |

*Primary Examiner*—Theodore A. Granger
*Attorney, Agent, or Firm*—Haseltine, Lake & Waters

[57] ABSTRACT

The drum-type honeycombless vacuum filter comprises a rotatable drum partly submerged in a pan holding the suspension to be filtered and having a distributor head disposed along its axis, one space of said distributor head being in communication with a vacuum chamber and another with a vacuum collector of filtrate. The drum is formed as a rigid inner plastic shell, with open-end vessels arranged in side-by-side relationship secured thereto. The channels defined in the vessels form a space for collection of filtrate. An outer shell is formed over said vessels by a binder-impregnated glass fabric wrapped over them. A drainage means in fluid flow communication with the channels of the vessels is secured to the outer shell. The channels of the vessels are communicated by a common annular channels opening through pipes into the distributor head.

1 Claim, 3 Drawing Figures

METHOD FOR MAKING A DRUM-TYPE HONEYCOMBLESS VACUUM FILTER

The invention relates generally to filtration equipment and more particularly to drum-type honeycombless vacuum filters for separation of suspensions by passing them through a deposited filter bed of suitable materials.

The drum-type honeycombless vacuum filter of the present disclosure offers maximum advantages in processing chemically corrosive liquids.

There are known in the art drum-type vacuum filters for separation of suspensions by passing them through a deposited filter bed of suitable materials, comprising a hollow metal drum partly submerged in a subjacent pan for processing the suspension, a mixer arranged in the pan, and drive means to actuate the drum and the mixer. The drum is a weldment formed with a plurality of partitions and stiffener ribs. Where the vacuum filter is used to process corrosive liquids all drum surfaces exposed to such liquids are lined with a special kind of rubber.

Mounted on the external surface of the drum is a drainage means whose inner spaces are in fluid flow communication via openings with the internal space for collection of filtrate from the drum.

The latter space communicates via two pipes with the vacuum chamber and the filtrate collector.

In the vacuum filter of record, before the main process of filtration the pan is filled with a certain amount of pulp containing, for instance, wood meal and by applying a partial vacuum in the drum space water is sucked through the drainage means into this space and, then piped into the collector, the wood meal precipitating on the drum surface thereby forming a deposited filter bed of suitable material which makes possible the main process of filtration.

The pan is then filled with the suspension to be filtered. The partial vacuum applied in the drum causes the filtrate to pass through the filter bed and the drainage means and into the drum space wherefrom it flows via a pipe into the filtrate collector. Part of the materials forming the filter bed on the drum surface is scraped off with a knife together with the cake and removed to the collector.

In order to apply the required vacuum in the drum space during the operation of the vacuum filter, the drum, especially its end face walls, must have adequate strength and stiffness since the drum structure is subjected to the atmospheric pressure. Hence, the need for an elaborate drum construction.

Also, protection of the drum surfaces exposed to corrosive action through the application of rubberized linings does not always produce the desired effect, while a drum construction of corrosion-proof metals would be uneconomical on account of their high cost.

It is an object of this invention to provide a drum-type honeycombless vacuum filter which would be functional in design, reliable in processing corrosive liquids, and long-lasting in service.

It is another object of this invention to provide a drum-type vacuum filter capable of discharging large amounts of filtrate.

This object is achieved by providing a drum-type honeycombless vacuum filter comprising a drum arranged to rotate about a horizontal axis and to be partly submerged in a subjacent pan holding the suspension to be filtered, a drainage means mounted on the external surface of the drum, a space for collection of filtrate in fluid flow communication with the space formed in the drainage means, wherein, according to the invention, the drum is formed of an inner rigid plastic shell to which are secured rigid plastic open-end vessels arranged parallel to the generatrixes of said shell in a side-by-side relationship, said vessels defining a plurality of channels which form said space for collection of filtrate from the drum; an outer cylindrical shell formed of binder-impregnated glass fabric wrapped around the vessels, the drainage means being secured to said shell, and the end faces of the inner and outer shells are connected by a common end face plate, provision being made between this end face plate and the end faces of the vessels for a clearance defining an annular channel on at least one side of the drum; a distributor head is disposed along the axis of the drum for communication via pipes with the annular channel and designed to provide communication between the filtrate collector space on the one hand and the vacuum chamber and the filtrate vacuum collector on the other.

The drum-type honeycombless vacuum filter of the disclosure has an advantage in that the filtrate collector space of the drum communicating with the source of vacuum is formed by the channels provided in the rigid plastic vessels in fluid flow communication with each other via a single annular channel capable of receiving large quantities of filtrate, also, in that the area of the drum end face plate subjected to the action of atmospheric pressure is much smaller than is the case with the vacuum filter of record, being the area of the annular channel on said drum end face plate.

The vessels arranged between the inner and outer shells contribute to the greater rigidity of the drum body.

Thus, a drum-type honeycombless drum construction incorporating the structural advantages of plastics permits discharge of large quantities of filtrate, since the fabrication of large-size drums of this type does not involve any special production problems, their end face plates are relieved of much of the effect of atmospheric pressure, the required structural rigidity is achieved, the weight is materially reduced, there is a saving in high-cost metals, and the service life of the vacuum filter is stretched.

The invention will become more readily understood from the following description of the embodiments and accompanying drawings, in which.

Figure 1:
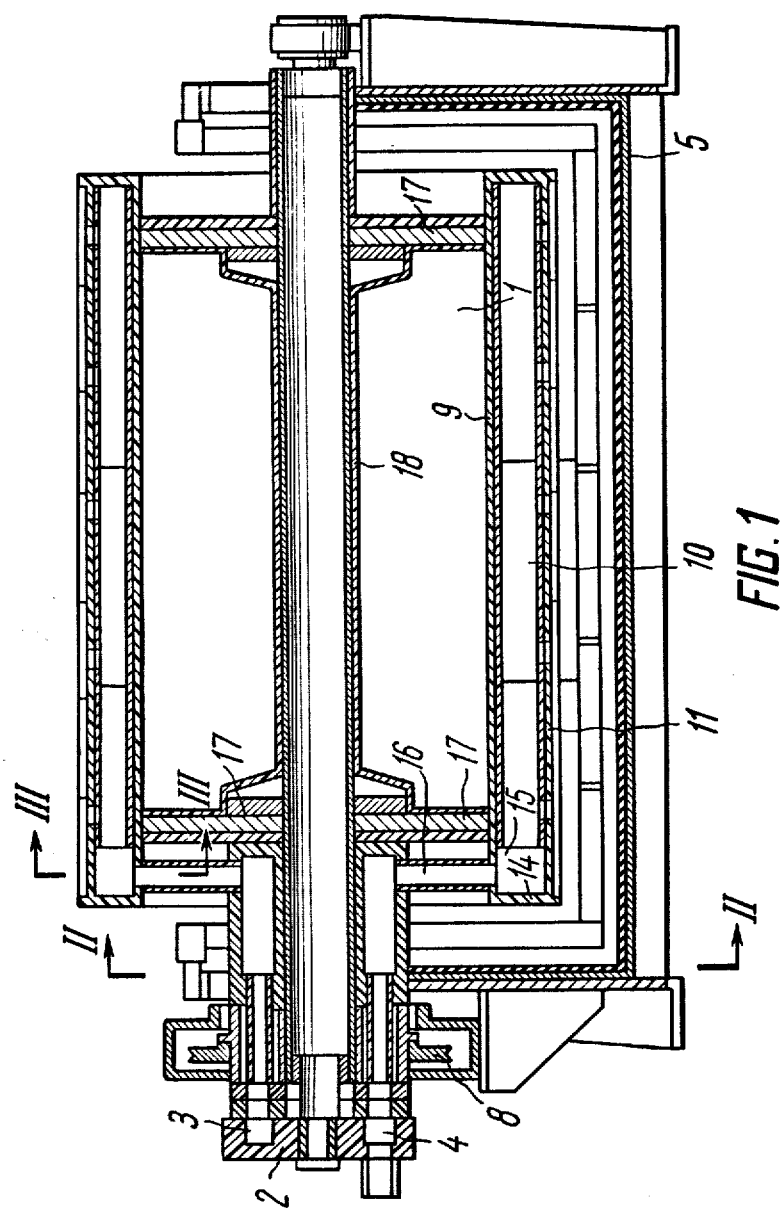
FIG. 1 is a cross-sectional view of the drum-type honeycombless vacuum filter according to the invention.
Figure 2:
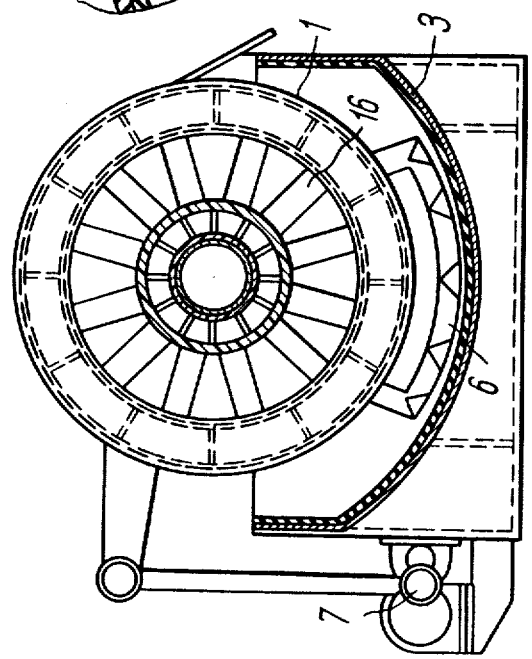
FIG. 2 is a view taken along the line I—II in FIG. 1.

The drum-type honeycombless vacuum filter adapted for separation of suspension by passing them through a deposited filter bed of suitable materials comprises a drum 1 (FIG. 1) arranged to rotate about a horizontal axis, a distributor head 2 disposed on the centerline of said drum and having a space 3 communicating with a vacuum chamber and also a space 4 in fluid flow communication with the filtrate vacuum collector. The drum 1 is partly submerged in a subjacent pan 5 holding the suspension to be filtered. The pan 5 has a mixer 6 (FIG. 2). The mixer 6 and the drum 1 have drive means 7 and 8 (FIG. 1) respectively.

Figure 3:
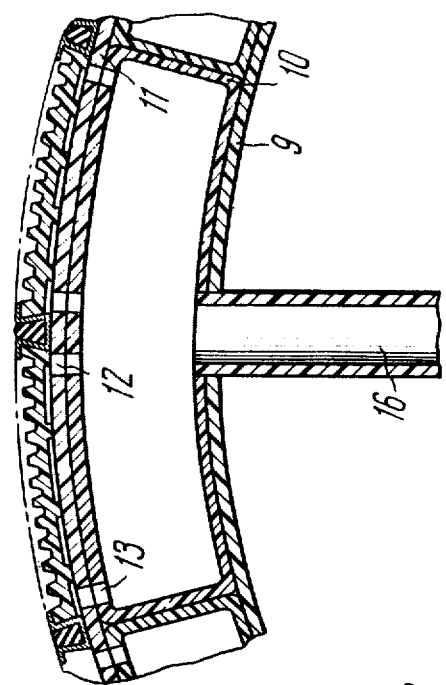
FIG. 3 is a blown-up view taken along the line II—III in FIG. 1.

The drum 1 is an internally located rigid plastic cylindrical shell 9 (FIGS. 1, 3) formed of binder-impregnated glass fabric wrapped over a surface. A plurality of rigid plastic open-end vessels 10 arranged in side-by-side relationship are secured to the inner shell 9 parallel to the generatrixes thereof. The internal channels in vessels 10 define the space for collection of filtrate. An outer cylindrical shell 11 formed of binder-impregnated glass fabric wrapped over the vessels 10 is secured to the outer cylindrical surface of the vessels 10. A drainage means 12 (FIG. 3) is secured to the outer shell 11. For ease of repair work, the drainage means 12 is mounted detachably. The space defined in the drainage means 12 is in fluid flow communication with the filtrate collector space 10 via openings 13 formed in the outer shell 11. The end face plates of the inner shell 9 and of the outer shell 11 are connected by a common end face plate 14 (FIG. 1). A clearance 10 forming an annular channel 15 is defined between the end face plate 14 and the end face plates of the vessels 10. The annular channel 15 may be formed either at one end face plate of the drum 1 as shown in FIG. 1 or at both end face plates (not shown in drawings). In the latter case distributor heads are installed at both end face plates of the drum 1. The channel 15 is in fluid flow communication with the spaces 3 and 4 of the distributor head 2 via pipes 16 (FIGS. 1, 2).

Torque generated by the drive means 8 is transmitted to the drum 1 via rims 17 secured to the flanges of the drive shaft 18.

The drum-type honeycombless vacuum filter of the present disclosure operates in the following manner.

Before the main process of filtration of suspension, the pan 5 is filled with pulp containing, for instance, a certain percentage of wood meal which forms on the surface of the drum 1 a deposited filter bed of suitable material which makes possible the filtration. When a partial vacuum is applied in the annular channel 15 and in the spaces in the vessels 10 by communicating them with the vacuum chamber (not shown in drawings) through the spaces 3 and 4 of the distributor head 2 and the pipe 16 opening into said spaces 3 and 4 the filtrate (water) is drained off through the drainage means 12 (FIG. 3) into the space in the vessels 10 and then on into the annular channel 15 wherefrom it is piped via the pipes 16 opening into the space 4 (FIG. 1) into the filtrate collector (not shown in drawings). As the drum 1 rotates the pipes 16 are alternately placed in communication with the space 3 of the distributor head 2, thus applying a partial vacuum in the filtrate collector space of the drum 1 and with the space 4 of the distributor head 2 thereby discharging filtrate into the filtrate collector. In the course of this operation a deposited layer of wood meal is formed on the surface of the drum 1 which makes possible the subsequent filtration.

The pan 5 is then filled with the suspension to be filtered, the drum is set rotating, a partial pressure is applied in the annular channel 15 and in the spaces of the vessels 10 by communicating them via the pipes 16 and the space 3 of the distributor head 2, in consequence of which filtrate passes through the drainage means 12 (FIG. 3) into the filtrate collector space defined by the vessels 10 and therefrom via the annular channel 15 and the pipes 16 into the space 4 (FIG. 1) of the distributor head and on into the filtrate collector. As the result of this action the solid particles of the suspension being filtered are caught in the pores of the deposited filter bed to be subsequently scraped off together with a thin layer of the filter bed material with a knife having a micrometric feed control.

Fabrication of strong light-weight vacuum filters of plastic construction is made possible by the fact that as a partial vacuum is applied in the drum 1 atmospheric pressure acts on the end face plate 14 rather than on the entire end plate of the drum.

What is claimed is:

1. A method for making a reinforced plastic honeycombless vacuum drum filter comprising the steps of: making a rigid open ended plastic shell rotatably mounted on an axis as an internal shell to said drum filter; constructing and arranging rigid plastic vessels communicating with each other and secured on said internal shell parallel to its generating lines in a side-by-side relationship, said vessels defining a plurality of channels forming a space for collecting filtrate from the surface of said drum filter, said vessels having cylindrical external surfaces; wrapping said cylindrical external surfaces of said plastic shells with binder-impregnated glass fabric forming the outer cylindrical shell of said drum filter forming openings in said outer shell; mounting a drainage means on said outer shell of said drum filter communicating through said opening with said space for collecting filtrate from said drum filter; connecting the faces of said inner and said outer shells with a common end face plate; allowing clearance between said end face plate and the end faces of said vessels for defining an annular channel on at least one side of said drum; and arranging said annular channel to communicate with fluid distributor means arranged around the axis of the drum by means of radial pipes.

* * * * *